(12) United States Patent
Schickler et al.

(10) Patent No.: US 10,920,637 B2
(45) Date of Patent: Feb. 16, 2021

(54) CALIBRATED NON-THERMAL PLASMA SYSTEMS FOR CONTROL OF ENGINE EMISSIONS

(71) Applicant: Paradigm of NY, LLC, Rochester, NY (US)

(72) Inventors: John F. Schickler, Rochester, NY (US); John H. Erbland, Fairport, NY (US); Neville F. Rieger, Pittsford, NY (US)

(73) Assignee: Paradigm of NY, LLC, Rochester, NY (US)

( * ) Notice: Subject to any disclaimer, the term of this patent is extended or adjusted under 35 U.S.C. 154(b) by 0 days.

(21) Appl. No.: 15/442,601

(22) Filed: Feb. 24, 2017

(65) Prior Publication Data

US 2017/0335731 A1 Nov. 23, 2017
US 2019/0360376 A9 Nov. 28, 2019

Related U.S. Application Data (63) Continuation-in-part of application No. 15/042,778, filed on Feb. 12, 2016, which is a continuation-in-part
(Continued)

(51) Int. Cl.
*F01N 3/20* (2006.01)
*F01N 3/035* (2006.01)
(Continued)

(52) U.S. Cl.
CPC ............ *F01N 3/208* (2013.01); *B01D 53/32* (2013.01); *B01D 53/9477* (2013.01);
(Continued)

(58) Field of Classification Search
CPC ...... F01N 3/30; F01N 11/007; F01N 2240/28; F02M 26/06; F02M 26/15
See application file for complete search history.

(56) References Cited

U.S. PATENT DOCUMENTS

| | | |
|---|---|---|
| 3,274,753 A | 9/1966 | Brandt |
| 3,856,476 A | 12/1974 | De Seversky |

(Continued)

FOREIGN PATENT DOCUMENTS

| | | | | |
|---|---|---|---|---|
| JP | 2012241524 A | * | 12/2012 | |
| KR | 20020054178 A | * | 7/2002 | ............ F02M 26/06 |

(Continued)

OTHER PUBLICATIONS

International Preliminary Report on Patentability and Written Opinion of PCT/US2017/019539 of the International Searching Authority completed Jun. 9, 2017 (4 pages).

*Primary Examiner* — Audrey K Bradley
(74) *Attorney, Agent, or Firm* — Andrew J. Anderson, Esq.; Harter Secrest & Emery LLP (57) ABSTRACT

The instant invention is based on techniques for using non-thermal plasma reactors in both the main exhaust pipe and in the exhaust gas recirculation feed pipe to reduce particulate matter sufficiently to meet EPA limits for PM and enhanced exhaust gas recirculation to meet NOx limits. More specifically, it is based upon the use of a non-thermal plasma device in which a high voltage charge in the plasma reactor causes extremely rapid oxidation of soot particles in the exhaust stream of an engine and further chemical reactions that aid in the reduction of NOx. The primary benefit of this technology is that it can be calibrated to optimize both soot and NOx reduction.

17 Claims, 8 Drawing Sheets

Related U.S. Application Data of application No. 14/072,577, filed on Nov. 5, 2013, now Pat. No. 9,260,998.

(60) Provisional application No. 62/299,549, filed on Feb. 24, 2016, provisional application No. 61/722,404, filed on Nov. 5, 2012.

(51) Int. Cl.
  *F01N 3/10*  (2006.01)
  *F01N 3/30*  (2006.01)
  *F01N 11/00*  (2006.01)
  *F02M 26/14*  (2016.01)
  *F02M 26/15*  (2016.01)
  *B01D 53/32*  (2006.01)
  *B01D 53/94*  (2006.01)

(52) U.S. Cl.
  CPC ............ *F01N 3/035* (2013.01); *F01N 3/103* (2013.01); *F01N 3/30* (2013.01); *F01N 11/007* (2013.01); *F02M 26/14* (2016.02); *F02M 26/15* (2016.02); *B01D 2259/818* (2013.01); *F01N 2240/28* (2013.01); *H05H 2245/1215* (2013.01)

(56) References Cited

U.S. PATENT DOCUMENTS

| | | | |
|---|---|---|---|
| 4,093,432 A | 6/1978 | Ahlrich | |
| 5,263,317 A | 11/1993 | Watanabe et al. | |
| 6,176,078 B1 * | 1/2001 | Balko | B01D 53/9431 60/274 |
| 6,482,368 B2 | 11/2002 | Hemingway et al. | |
| 6,852,200 B2 | 2/2005 | LaBarge et al. | |
| 7,361,212 B2 | 4/2008 | Clark et al. | |
| 7,517,504 B2 | 4/2009 | Taylor | |
| 8,157,902 B2 | 4/2012 | Ogut et al. | |
| 9,260,997 B2 | 2/2016 | Rieger et al. | |
| 9,920,671 B2 | 3/2018 | Rieger et al. | |
| 2001/0042372 A1 * | 11/2001 | Khair | F01N 3/0275 60/278 |
| 2003/0168332 A1 | 9/2003 | Hall et al. | |
| 2004/0185396 A1 | 9/2004 | Rosocha et al. | |
| 2004/0219084 A1 | 11/2004 | Hall et al. | |
| 2005/0019714 A1 | 1/2005 | Platts et al. | |
| 2005/0109029 A1 * | 5/2005 | Busch | F01N 3/22 60/605.1 |
| 2005/0138916 A1 * | 6/2005 | Bonadies | F01N 3/021 60/275 |
| 2006/0018812 A1 | 1/2006 | Taylor et al. | |
| 2006/0113181 A1 * | 6/2006 | Hirata | B01D 53/9431 204/173 |
| 2007/0045101 A1 | 3/2007 | Ogut et al. | |
| 2008/0092533 A1 | 4/2008 | Tennison | |
| 2008/0296508 A1 | 12/2008 | Small | |
| 2009/0165439 A1 | 7/2009 | Hoshi et al. | |
| 2009/0241775 A1 * | 10/2009 | Ogut | F01N 3/38 95/59 |
| 2011/0072799 A1 | 3/2011 | Bidner et al. | |
| 2014/0165560 A1 * | 6/2014 | Henry | F02M 26/15 60/605.2 |
| 2015/0316004 A1 * | 11/2015 | Balthes | F01N 3/0231 60/274 |

FOREIGN PATENT DOCUMENTS

| | | |
|---|---|---|
| RU | 2105164 C1 | 2/1998 |
| WO | 2005060446 A2 | 7/2005 |

\* cited by examiner

Calibrated Non-Thermal Plasma System

FIG. 2C

FIG. 2D Calibrated Non-Thermal Plasma System with Multiple Reactors

FIG. 3A

| | MPH | kV | | Mass, mg | Mass, mg | Change, mg | % PM Reduction |
|---|---|---|---|---|---|---|---|
| Baseline | 40 | 20 | 16-10-001 | 78.412 | 78.694 | 0.282 | |
| Plasma reactor | 40 | 20 | 16-10-004 | 79.905 | 79.985 | 0.080 | -71.6% |
| Plasma reactor | 40 | 20 | 16-10-005 | 79.989 | 80.024 | 0.035 | -87.6% |
| Post reactor+DOC | 40 | 20 | 16-10-008 | 79.560 | 79.581 | 0.021 | -92.6% |
| Post reactor+DOC | 40 | 20 | 16-10-009 | 79.781 | 79.82 | 0.039 | -86.2% |
| Post reactor+DOC | 40 | 20 | 16-10-011 | 79.466 | 79.505 | 0.039 | -86.2% |
| Baseline | 50 | 20 | 16-10-002 | 79.328 | 79.799 | 0.471 | |
| Plasma reactor | 50 | 20 | 16-10-003 | 80.029 | 80.1 | 0.071 | -84.9% |
| Plasma reactor | 50 | 20 | 16-10-006 | 79.255 | 79.321 | 0.066 | -86.0% |
| Post reactor+DOC | 50 | 20 | 16-10-007 | 78.534 | 78.613 | 0.079 | -83.2% |
| Post reactor+DOC | 50 | 20 | 16-10-010 | 80.938 | 80.966 | 0.028 | -94.1% |

FIG. 3B

| | RPM | kV | Filter S/N | Initial Mass, (mg) | Final Mass, (mg) | Difference (mg) | Comments | Pre reactor | Post reactor | % PM Reduction vs Pre reactor | % PM Reduction vs EGR by-pass |
|---|---|---|---|---|---|---|---|---|---|---|---|
| Pre reactor | 700 | 0 | 16-07-031 | 79.467 | 79.597 | 0.130 | Treated by Paradigm EGR only | 0.124 | | | |
| Pre reactor | 700 | 0 | 16-07-032 | 79.902 | 80.019 | 0.117 | Average of Filters 031 and 032 | | | | |
| Post reactor | 700 | 0 | 16-07-033 | 80.261 | | | Filter scrapped | | | | |
| Post reactor | 700 | 12.5 | 16-07-034 | 80.361 | 80.437 | 0.076 | Treated by Paradigm EGR and Paradigm AT | | 0.076 | -38.5% | -65.6% |
| Post reactor | 700 | 15 | 16-07-035 | 79.983 | 80.051 | 0.068 | Treated by Paradigm EGR and Paradigm AT | | 0.068 | -44.9% | -69.2% |
| Post reactor | 700 | 17.5 | 16-07-036 | 78.912 | 78.959 | 0.047 | Treated by Paradigm EGR and Paradigm AT | | 0.047 | -61.9% | -78.7% |
| Post reactor | 700 | 20 | 16-07-037 | 79.770 | 79.809 | 0.039 | Treated by Paradigm EGR and Paradigm AT | | 0.039 | -68.4% | -82.4% |
| Post reactor | 700 | 22.5 | 16-07-038 | 79.262 | 79.291 | 0.029 | Treated by Paradigm EGR and Paradigm AT | | 0.029 | -76.5% | -86.9% |
| EGR by-pass | 700 | 0 | 16-07-039 | 79.166 | 79.387 | 0.221 | Exhaust by-passed Paradigm EGR | 0.221 | | | |
| EGR by-pass | 1400 | 0 | 16-07-040 | 80.491 | 81.278 | 0.787 | Exhaust by-passed Paradigm EGR | 0.787 | | | |
| Post reactor | 1400 | 15 | 16-07-041 | 79.519 | 79.892 | 0.373 | Treated by Paradigm EGR and Paradigm AT | | 0.373 | -24.9% | -52.6% |
| Post reactor | 1400 | 15 | 16-07-042 | 80.753 | 81.215 | 0.462 | Treated by Paradigm EGR and Paradigm AT | | 0.462 | -7.0% | -41.3% |
| Post reactor | 1000 | 20 | 16-07-043 | 80.408 | 80.572 | 0.164 | Treated by Paradigm EGR and Paradigm AT | | 0.164 | -67.0% | -79.2% |
| Pre reactor | 1400 | 20 | 16-07-044 | 80.150 | 80.363 | 0.213 | Treated by Paradigm EGR and Paradigm AT | | 0.213 | -57.1% | -72.9% |
| Post reactor | 1400 | 24 | 16-07-045 | 80.351 | 80.538 | 0.187 | Treated by Paradigm EGR and Paradigm AT | | 0.187 | -62.4% | -76.2% |
| Pre reactor | 1400 | 0 | 16-07-046 | 80.138 | 80.646 | 0.508 | Treated by Paradigm EGR only | 0.497 | 0.358 | | |
| Pre reactor | 1400 | 0 | 16-07-047 | 81.130 | 81.616 | 0.486 | Average of Filters 046 and 047 | | | | |
| Post reactor | 1400 | 25 | 16-07-048 | 80.500 | 80.661 | 0.161 | Treated by Paradigm EGR and Paradigm AT | | 0.161 | -67.6% | -79.5% |
| Post reactor | 1400 | 25 | 16-07-049 | 79.837 | 80.042 | 0.205 | Treated by Paradigm EGR and Paradigm AT | | 0.205 | -58.8% | -74.0% |
| Post reactor | 1400 | 25 | 16-07-050 | 81.000 | 81.128 | 0.128 | Treated by Paradigm EGR and Paradigm AT | | 0.128 | -74.2% | -83.7% |

FIG. 3C

| | RPM | kV | Filter S/N | Mass, (mg) | Mass, (mg) | Difference (mg) | Comments | Pre Reactor | Post Reactor | % PM Reduction |
|---|---|---|---|---|---|---|---|---|---|---|
| Pre reactor | 700 | 25 | 16-5-001 | 78.403 | 78.584 | 0.181 | | 0.183 | | |
| Post reactor | 700 | 25 | 16-5-002 | 80.114 | 80.172 | 0.058 | | | 0.058 | -68.3% |
| Pre reactor | 700 | 15 | 16-5-003 | 79.968 | 80.153 | 0.185 | | | | |
| Post reactor | 700 | 15 | 16-5-004 | 79.896 | 79.924 | 0.028 | | | 0.028 | -84.7% |
| Post reactor | 700 | 20 | 16-5-005 | 81.362 | 81.405 | 0.043 | | | 0.043 | -76.5% |
| Post reactor | 700 | 30 | 16-5-006 | 80.007 | 80.050 | 0.043 | | | 0.043 | -76.5% |
| Pre reactor | 1400 | 25 | 16-5-007 | 78.643 | 78.961 | 0.318 | | 0.318 | | |
| Post reactor | 1400 | 25 | 16-5-008 | 79.767 | 79.891 | 0.124 | | | 0.124 | -61.0% |
| Post reactor | 1400 | 15 | 16-5-009 | 79.715 | 79.841 | 0.126 | | | 0.126 | -60.4% |
| Post reactor | 1400 | 20 | 16-5-010 | 79.057 | 79.170 | 0.113 | | | 0.113 | -64.5% |
| Post reactor | 1400 | 27.5 | 16-5-011 | 79.201 | 79.312 | 0.111 | | | 0.111 | -65.1% |
| Pre reactor | 2100 | 25 | 16-5-012 | 81.099 | 81.885 | 0.786 | | 0.786 | | |
| Post reactor | 2100 | 25 | 16-5-013 | 79.778 | 80.251 | 0.473 | | | 0.473 | -39.8% |
| Post reactor | 2100 | 15 | 16-5-014 | 78.718 | 79.005 | 0.287 | | | 0.287 | -63.5% |
| Post reactor | 2100 | 20 | 16-5-015 | 79.450 | 79.763 | 0.313 | | | 0.313 | -60.2% |
| Post reactor | 2100 | 27.5 | 16-5-016 | 78.405 | 78.763 | 0.358 | | | 0.358 | -54.5% |
| Pre reactor | 700 | | 16-5-017 | 78.584 | 79.098 | 0.514 | Unipower | 0.514 | | |
| Post reactor | 700 | 25 | 16-5-018 | 80.453 | 80.509 | 0.056 | Unipower | | 0.056 | -89.1% |
| Post reactor | 700 | 15 | 16-5-019 | 81.086 | 81.208 | 0.122 | Unipower | | 0.122 | -76.3% |
| Post reactor | 700 | 25 | 16-5-020 | 80.304 | 80.337 | 0.033 | Unipower | | 0.033 | -93.6% |
| Post reactor | 700 | 20 | 16-5-021 | 79.627 | 79.761 | 0.134 | Unipower | | 0.134 | -73.9% |
| Post reactor | 700 | 30 | 16-5-022 | 78.810 | 78.872 | 0.062 | Unipower | | 0.062 | -87.9% |
| Pre reactor | 1400 | | 16-5-023 | 80.291 | 81.047 | 0.756 | Trek 20/20 | 0.735 | | |
| Post reactor | 1400 | 20 | 16-5-024 | 81.057 | 81.450 | 0.393 | Trek 20/20 | | 0.393 | -46.5% |
| Post reactor | 1400 | 20 | 16-5-025 | 80.230 | 80.944 | 0.714 | Trek 20/20 | | | -100.0% |
| Post reactor | 1400 | 15 | 16-5-026 | 80.192 | 80.620 | 0.428 | Trek 20/20 | | 0.428 | -41.8% |
| Post reactor | 1400 | 15 | 16-5-027 | 80.291 | 80.650 | 0.359 | Trek 20/20 | | 0.359 | -51.2% |
| Pre reactor | 2100 | 22 | 16-5-028 | 80.746 | 83.398 | 2.652 | Trek 20/20 | 2.652 | | |
| Post reactor | 2100 | 20 | 16-5-029 | 80.029 | 81.864 | 1.835 | Trek 20/20 | | 1.835 | -30.8% |
| Post reactor | 2100 | 21.3 | 16-5-030 | 79.398 | 80.289 | 0.891 | Trek 20/20 | | 0.891 | -66.4% |

CALIBRATED NON-THERMAL PLASMA SYSTEMS FOR CONTROL OF ENGINE EMISSIONS

CROSS-REFERENCE TO RELATED APPLICATIONS

This application claims the benefit of U.S. Provisional Application Ser. No. 62/299,549 titled "Calibrated Non-Thermal Plasma Systems for Control of Diesel Emissions" filed Feb. 24, 2016. This application is also a continuation-in-part of U.S. patent application Ser. No. 15/042,778, filed Feb. 12, 2016, now U.S. Pat. No. 9,920,671 issued on Mar. 20, 2018; which is a continuation-in-part of U.S. patent application Ser. No. 14/072,577, filed Nov. 5, 2013, now U.S. Pat. No. 9,260,998, which issued on Feb. 16, 2016, and which claims the benefit of U.S. Provisional Application No. 61/722,404, filed Nov. 5, 2012.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Field of the Invention

The instant invention pertains generally to non-thermal plasma related systems and methods of use of such systems in reducing pollutants and particularly particulate matter and Nitrous Oxides in the gas stream of internal combustion engines, including diesel engines. More particularly, the instant invention is directed to a calibrated system for placement and control of such non-thermal plasma-based systems.

RELEVANT ART

Figure 1:
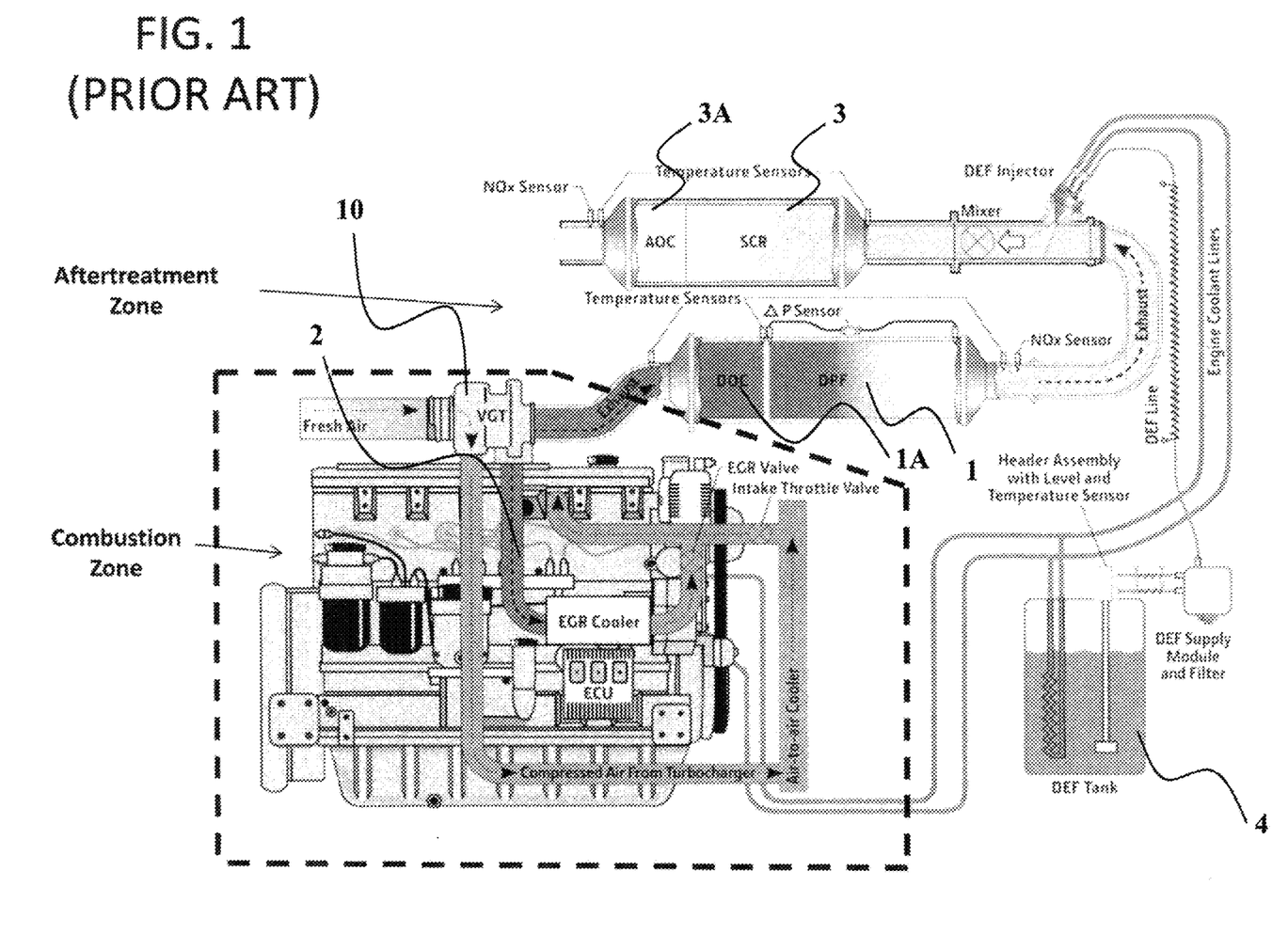
FIG. 1 provides a schematic diagram of a prior art system of emission treatment in association with a diesel engine.

Understanding of current methods of control of particulate matter (PM) and nitrous oxides (NOx) in internal combustion engines can be facilitated by reference to FIG. 1, illustrating a prior art emission control system for a diesel engine. These methods rely upon a combination of diesel particulate filters 1 (also referred to as DPF 1) for reducing PM emissions and exhaust gas recirculation 2 (also referred to as EGR 2) or selective catalytic reduction 3 (also referred to as SCR 3) for reduction of NOx. However, though the control of NOx through usage of Exhaust Gas Recirculation 2 to cool the combustion process is a technology employed extensively in gasoline engines, its usage in diesels is a greater challenge because of the propensity of those engines to emit more PM as the combustion process is cooled.

Therefore, although Exhaust Gas Recirculation 2 is a relatively proven technology in gasoline engines, it has met with resistance to further usage by numerous diesel manufacturers. Diesel manufacturers currently advocate usage of SCR 3 (Selective Catalytic Reduction) instead of Exhaust Gas Recirculation 2 due to the problems caused by PM accumulations in both the induction and the exhaust systems of diesel engines. Even in diesel engines using new Diesel Particulate Filter 1 technology in conjunction with Exhaust Gas Recirculation 2 it has been found that induction systems were severely contaminated with PM. In many cases the intake systems become so badly clogged that the soot has to be chipped out with hand tools and the components soaked in brake cleaner to restore the engine to normal operation.

The above analysis indicates that the root causes of the failure of Exhaust Gas Recirculation 2 in diesel systems arise directly from the vulnerability of the exhaust management systems to PM contamination. Therefore, capturing the PM in a DPF 1 does nothing to prevent the upstream problems. Any component of exhaust management upstream of the DPF 1 is therefore vulnerable unless measures are taken to eliminate the PM in the upstream systems. Further, while SCR 3 is a successful way to reduce NOx, it is also reliant upon replenishing of the reactant, usually an aqueous urea fluid called Diesel Exhaust Fluid, or DEF 4, and also requires tanks, pumps and controls over the rate of injection. Therefore, some manufacturers have sought to retain Exhaust Gas Recirculation 2 and not adopt SCR 3 as their method of meeting emission standards for NOx while using DPF 1 to control PM. This approach has also proved unsuccessful. Further, reduction of PM with DPF 1 has its own set of problems in costs of maintenance of the filter itself as well as of the regeneration control systems. In addition, the filters can be very obtrusive in their mounting and locations, as well as being an added weight on the vehicle. Moreover, they require additional fuel usage for regeneration.

Outside of the aforesaid problems, current clean diesel technology relies upon sensing of various engine parameters that influence both combustion and exhaust after treatment. The technical challenge of creating these systems is to calibrate and balance the control of all of these parameters to control exhaust emissions while still providing the power required for the application of the engine. The basis of calibration in the control of internal combustion engines is to achieve a perfect stoichiometric ratio of air to fuel under all driving conditions. Current federal mandates expect automatic fuel trim under the complete driving cycle, even under varying conditions that include: Ambient conditions; Altitude; Road surface conditions, Acceleration and deceleration, including braking; Load; Driver habits; and Idling vs. driving. The sensors required to accomplish the above performance are currently over 100 in number. The monitoring systems to determine carbon output and fuel economy can calculate carbon conversion down to the atomic level of fuel at fill-up to that in exhaust and in the exhaust filter. They assume complete conversion of the carbon into either a gas or to elemental carbon. The Electronic Control Module 6 (also referred to as ECM 6) for the engine automatically adjusts for the above conditions and alters the fuel trim according to the original calibration. However, as previously discussed, if the sticky Particulate Matter (PM) gets trapped on the exhaust tubing, cylinder walls or other unintended surfaces, then the carbon counting becomes erroneous and the calibration drifts to being erroneous.

These problems led to the development of non-thermal plasma (NTP 5) as a potential replacement for DPF 1, or minimally, as a means of reducing the size and maintenance of DPFs 1 as well as a way to protect the upstream components, including the Exhaust Gas Recirculation 2 system, from soot contamination. The use of non-thermal plasma systems/reactors (NTP 5) to reduce harmful emissions has proven to be especially beneficial in increasing combustion efficiency while improving emissions. A plasma is an ionization gas where atoms as well as positive and negative ions and electrons are intermixed, though it may be electrically neutral in the aggregate. A thermal plasma (such as an electric arc) is a plasma which is, in the aggregate, comprised of constituents at the same heated temperature, while a non-thermal plasma (such as a neon lamp) is one where the electrons are "hot" while the other components of the plasma are "cold."

NTPs 5 can be used to break up large organic fuel molecules for easier and more complete combustion. (See, e.g., U.S. Patent Publication Nos. 2004/0185396, and 2005/0019714). NTPs 5 have also been shown to be useful in reducing NOx emissions (U.S. Pat. Nos. 6,482,368 and 6,852,200) as well as reducing particulate matter (U.S. Pat. No. 5,263,317 and U.S. Patent Publication No. 2007/0045101). (See, also, U.S. Pat. No. 9,260,998). However, NTP 5 systems in diesel engines have nonetheless proven hard to implement due to the effects of the pollutants and breakdown products on these systems, and particularly by the accumulation of particulate matter, which can result in physical blockage of narrow gas-flow regions and other problems. Thus, though NTP 5 systems have shown remarkable promise, it is clear that there is a need for NTP-based systems in which PM accumulation is efficiently reduced or eliminated. This allows and/or maximizes the benefit of NTP in converting PM into gaseous carbon compounds, such as carbon dioxide, and assists the ECM in maintaining a reliable fuel trim over all drive cycles and conditions. Therefore, the entire control system remains in tune to maintain optimum engine performance and the lowest emissions, along with optimum fuel economy.

SUMMARY OF THE INVENTION

The instant invention is based on techniques for using NTP 5 in both the main exhaust pipe and in the Exhaust Gas Recirculation 2 feed pipe to reduce PM sufficiently to meet EPA limits for PM and enhanced EGR 2 to meet NOx limits. More specifically, it is based upon the use of a non-thermal plasma (NTP 5) device in which a high voltage charge in the plasma reactor causes extremely rapid oxidation of soot particles in the exhaust stream of an engine and further chemical reactions that aid in the reduction of NOx. The primary benefit of this technology is that it can be calibrated to optimize both soot and NOx reduction, depending upon the choices made in the engine design.

In addition, the invention meets EPA limits without usage of DPFs 1, allowing usage of the invention on engines for vehicles and diesel powered equipment as the original installation, and thereby opening the device to a broad market potential far into the future. These goals and objects are accomplished via the aforesaid use of calibrated non-thermal plasma systems utilizing calibration parameters necessary to integrate the system on a variety of engines.

Further, the invention calibrates the functions and efficiency of NTP 5 in coordination with other systems of emission control through the engine control module (ECM 6). This calibration is possible by altering a number of the plasma generation functions, as well as by altering the constituents of the gas streams entering the NTP 5 reactor. For example, alteration of the applied voltage and sharing of power throughout the plasma reactor for maximum efficiency are both possible.

Moreover, the inventors have found that the exhaust constituents may be altered by bleeding compressed air into both the Exhaust Gas Recirculation 2 loop and the main exhaust before it reaches the NTP 5 reactor and discovered that doing so enhances the efficiency of the NTP 5 reactor in oxidizing PM. The basis for the beneficial effects of air injection is that NTP 5 reactors are oxygen dependent. Therefore, to the extent that oxygen can be used to maximum efficiency in the reaction, the overall efficiency of the NTP 5 can be enhanced by assuring an abundance of oxygen. Thus, in sum, our invention accomplishes the following objects and goals and/or provides the following benefits:

(1) No interference with or alteration of existing EPA-approved systems.
(2) Continuous reduction of PM and NOx throughout all drive cycles.
(3) No maintenance or adjustments.
(4) Protection of Emission Controls and Exhaust Aftertreatment Systems via reductions in: Exhaust Gas Recirculation valve and cooler clogging and failures; Diesel Oxidation Catalyst face plugging and sensor contamination: Diesel Particulate Filter dosing frequency, sensor contamination, plugging and filter cleaning; SCR dosing frequency, DEF usage and frequency of injector contamination by urea; and Turbocharger sensor contamination.
(5) Protection of Base Engine via reductions in: Oil contamination, viscosity growth, lubricity loss and sludge deposits; Cylinder wear and carbon jacking of rings; Wear of cam shafts, followers and rocker arms; Turbocharger bearing failures due to oil contamination; and Oil change frequency.
(6) Fuel Economy and Combustion Improvement via reductions in: Exhaust Gas Recirculation requirement for control of NOx; Backpressure in exhaust plumbing; Turbocharger tailoring of Exhaust Gas Recirculation vs. boost; Cylinder wall friction; and thin films on cylinder wall interference with combustion.

These and other aspects of the inventive concept and goals can best be understood by reference to the drawing figures and description that follow.

BRIEF DESCRIPTION OF THE DRAWINGS

The novel features believed to be characteristic of this invention are set forth with particularity in the appended claims. The invention itself, however, both as to its organization and method of operation, together with further object and advantages thereof, may best be understood by reference to the following description taken in connection with the accompanying drawings in which:

FIG. 3B provides experimental data showing the impact of varying voltage and rpm and sampling exhaust at three separate sites in the exhaust system, with highest PM reduction achieved at 86.9%.

FIG. 3C provides experimental data showing the impact of varying voltage and rpm and sampling exhaust at two separate sites in the exhaust system, with highest PM reduction achieved at 100%.

DESCRIPTION

As previously noted, the inventors have determined that the overall efficiency of the NTP 5 reactor can be enhanced by assuring an abundance of oxygen. The following two examples of experimental results achieved further confirm these findings.

Example 1: Dynamometer Tests of a 2010 Freightliner M2 Tractor Equipped with a Cummins 8.3 Liter Diesel with Exhaust Gas Recirculation (EGR) 2 and DPF 1 Aftertreatment—Engine Out Overall Emissions

| PEMS Emission Analyzer Aggregate Summary - Average Values | | | |
|---|---|---|---|
| O2[%] | NOx[ppm] | FC[g/s] | PM10[mg/s] |
| 50 MPH | | | |
| 12.16 | 142 | 5.32 | 0.449 |
| 30 MPH | | | |
| 15.82 | 132 | 3.38 | 0.298 |

Example 2: Dynamometer Tests of a 2010 Freightliner M2 Tractor Equipped with a Cummins 8.3 Liter Diesel with Exhaust Gas Recirculation 2 and DPF 1 after Treatment—Engine Out and Tailpipe Particulate Matter (PM) at Various Engine Operating Modes

| Gas Analyzer PM Level Correlation (10 mg/sec) with Gravimetric Filter Samples | Engine Out PM Level | Tailpipe (TP) | TP % Steady | NTP System Residual Capac.* |
|---|---|---|---|---|
| 30 MPH Steady Throttle | 0.2724 | 0.0378 | | |
| 30 MPH Fan Clutch Activated | 0.5876 | 0.0421 | 10.2% | |
| 30 MPH Acceleration, Idle to 30 MPH | 0.7867 | 0.0422 | 1.11% | |
| 30 MPH Aggregate | 0.294 | 0.0392 | 3.7% | +30% |
| 50 MPH Steady Throttle | 0.3277 | 0.0362 | | |
| 50 MPH Fan Clutch Activated | 0.559 | 0.0417 | 15.2% | |
| 50 MPH Acceleration Idle to 50 MPH | 1.750 | 0.1283 | 254% | |
| 50 MPH Aggregate: | 0.450 | 0.045 | 24% | +24.5% |

*Residual Capac. = NTP % PM Reduction per Gravimetric Analysis minus Tailpipe PM % Steady without NTP.

Figure 3A:
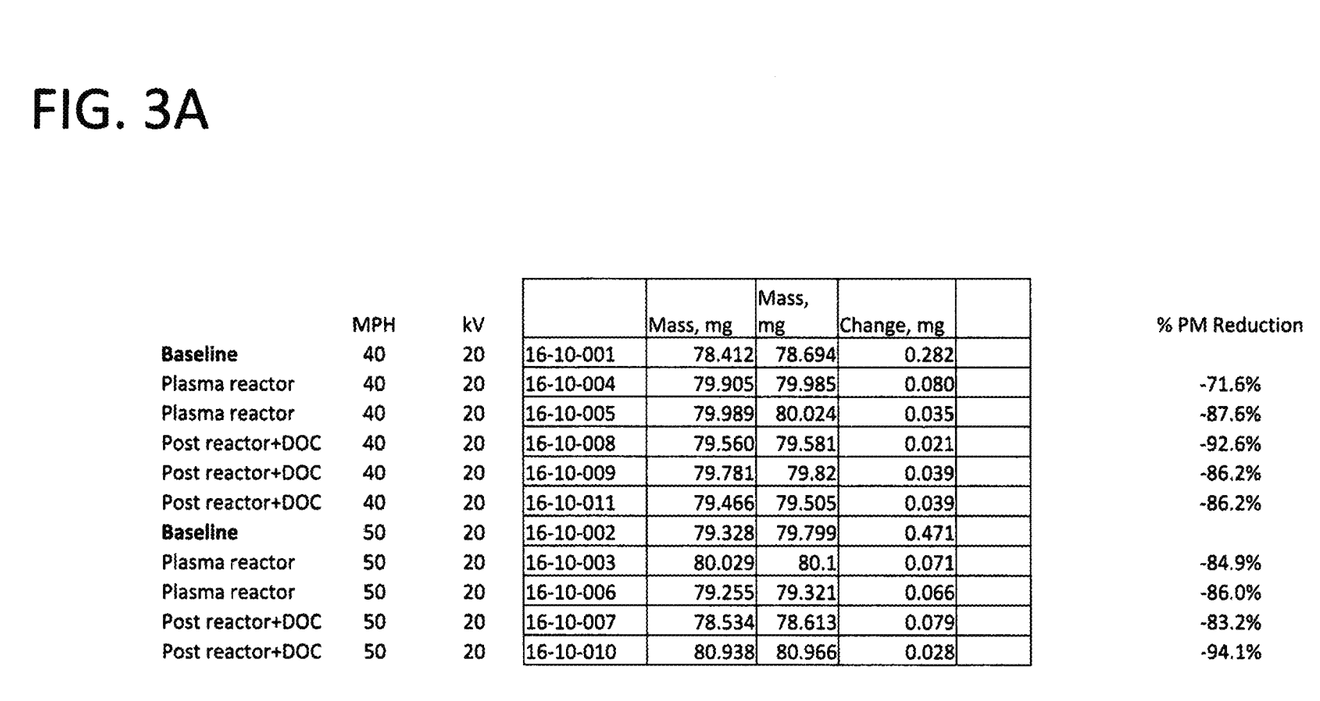
FIG. 3A provides experimental data showing the impact of a fixed voltage at two vehicle speeds, 40 and 50 mph, with the highest PM reduction achieved at 94.1%.

The above research clearly indicates that the usage of NTP 5 as a means of reducing PM and NOx in diesel exhaust gases is a process that depends upon oxygen availability in the exhaust stream and that the efficiency of the process is dependent upon both the power available in the NTP 5 as well as upon the operating mode of the engine. Therefore, application of NTP 5 requires a calibration of power availability at each NTP 5 reactor in the exhaust stream as well as insurance of sufficient oxygen availability to maximize PM reduction at various driving modes of the vehicle. The following embodiments achieve those requirements by integrating insertion of NTP 5 enhancements to existing aftertreatment systems, with the additional potential that some portions of the existing aftertreatment systems may be eliminated or down-sized. (See, also, FIGS. 3A-3C, which serve to reinforce the concepts already presented that the efficiency of PM reduction is the result of calibrated factors that comprehend engine load and RPM).

Figure 2A:
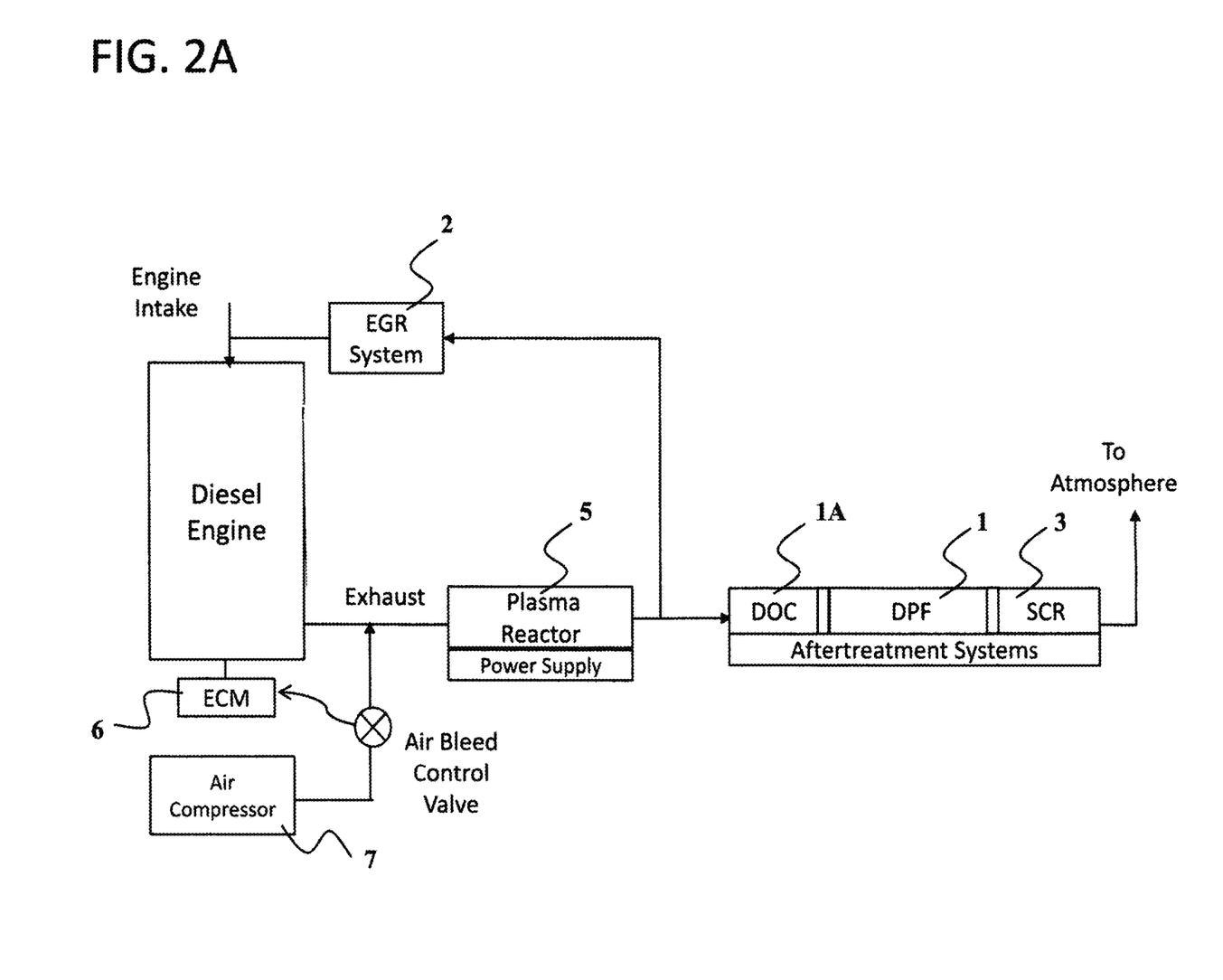
FIG. 2A provides a first schematic diagram of an emission treatment system in accordance with the teachings of the invention in association with a diesel engine, illustrating a single reactor NTP system inserted into the exhaust stream prior to the Exhaust Gas Recirculation tap and other features.
Figure 2B:
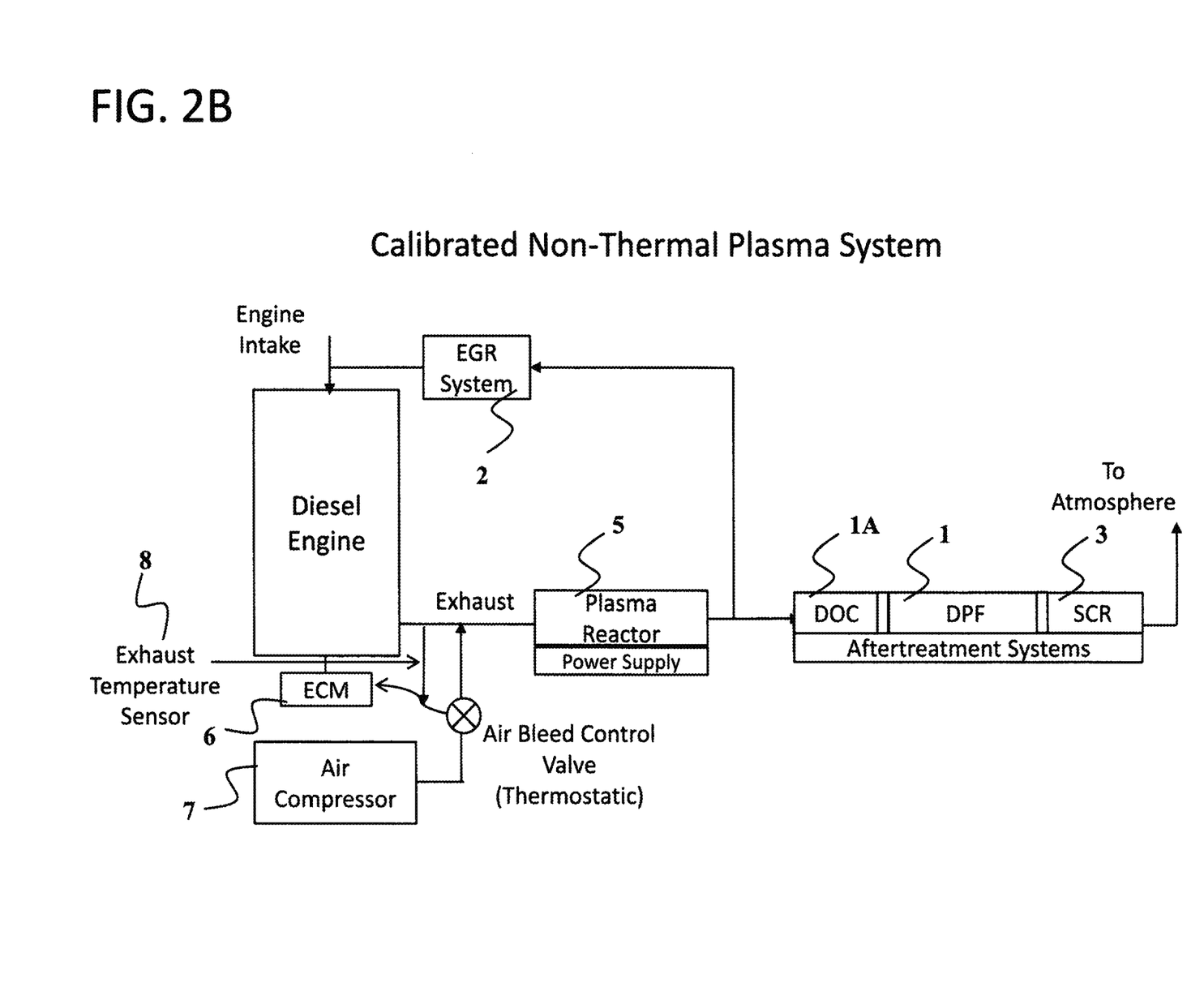
FIG. 2B provides a second schematic diagram of an emission treatment system in accordance with the teachings of the invention in association with a diesel engine, illustrating the same concepts as FIG. 2A with the addition of a temperature sensor in the exhaust stream and other features.
Figure 2C:
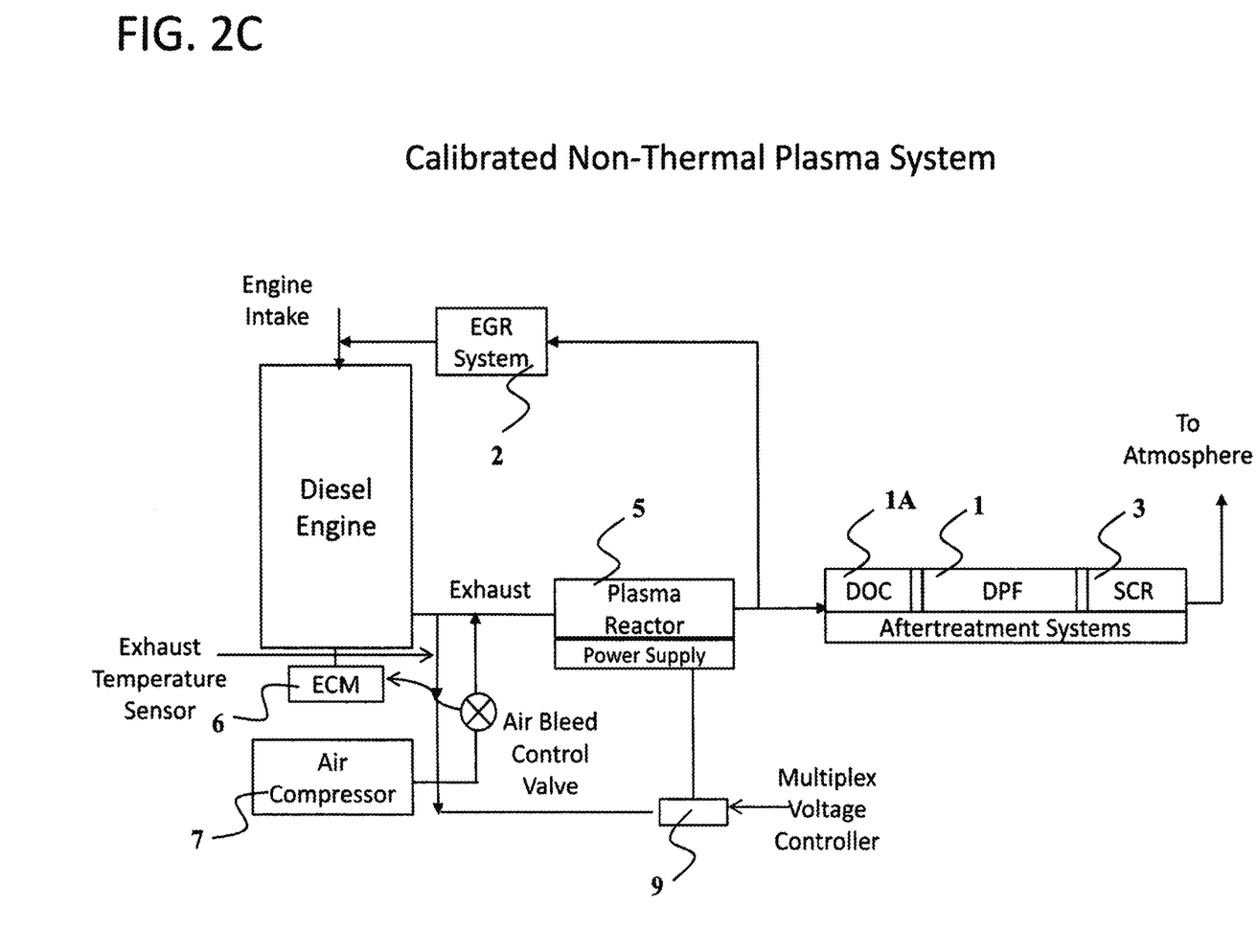
FIG. 2C provides a third schematic diagram of an emission treatment system in accordance with the teachings of the invention in association with a diesel engine, illustrating the same concept as FIG. 2B with the addition of a multiplexer connected to the NTP system power supply and other features.
Figure 2D:
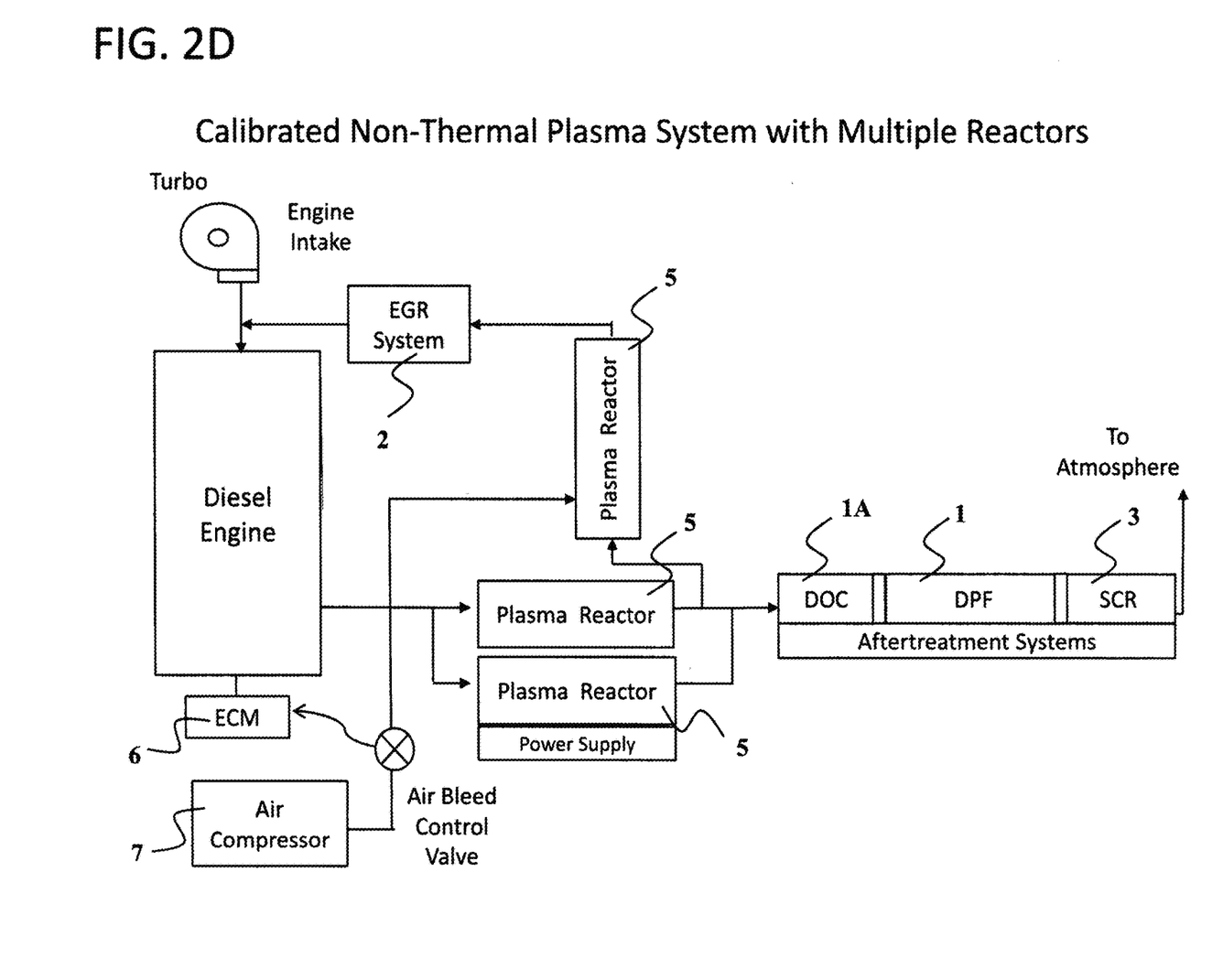
FIG. 2D provides a fourth schematic diagram of an emission treatment system in accordance with the teachings of the invention in association with a diesel engine, illustrating the same concepts as FIG. 2C with the application to a multiple reactor NTP system and other features.

As noted, FIGS. 2A through 2D illustrate various system arrangements in keeping with the teachings of the invention. FIG. 2A illustrates a single NTP 5 reactor insertion into the exhaust stream prior to the Exhaust Gas Recirculation 2 tap, with the additional provision of air (or oxygen) injection at the NTP 5 reactor controlled by a valve between the air source 7 and the NTP 5. Any number of discs within the NTP 5 reactor are included and air injection rate is controlled to maximize efficiency (sufficient residual capacity) of PM removal for various engine operating modes. FIG. 2B illustrates the same concepts as FIG. 2A with the addition of a temperature sensor 8 in the exhaust stream connected to a thermostatically controlled valve for calibration of the air (or oxygen) injection rate. FIG. 2C illustrates the same concept as FIG. 2B with the addition of a multiplexer 9 connected to the NTP 5 system power supply in preparation for power sharing to multiple NTP 5 reactors. FIG. 2D illustrates the same concepts as FIG. 2C with the application to multiple NTP 5 reactors for maximum efficiency in PM removal and NOx reduction through pretreatment of the gases entering either the Exhaust Gas Recirculation 2 loop or the main aftertreatment system or both. As will be noted, the multiple NTP 5 reactors are (and can) be arranged in both series and parallel arrangements.

While the embodiments are illustrated as capable of operation as independent systems, they are also capable of being separately controlled by linkage with the main control system of the engine. It is of primary importance, and is indeed the essence of the claims, that the NTP 5 system be calibrated to work in concert with the other control systems of the engine and be both sized and calibrated in such a manner as to achieve optimum reactivity and capacity for both PM and undesirable exhaust gas reductions. The sizing and calibrations of the NTP 5 system is achieved through the application of a mathematical model already existing in current electronic control modules 6 which comprehends the premeasured loading of the engine, its operating modes and the resultant exhaust stream variables, including oxygen levels. Radial clearance flow, flow rate of the exhaust, and the electrical potential across the radial clearance are examples of key parameters included in the model. That modeling is assumed in the claims.

Essential to the success of NTP 5 as a means of controlling PM and exhaust gases in a diesel engine is the provision of power sharing for maximum efficiency at each NTP 5 reactor. Therefore, the mathematical model used by the ECM 6 predetermines the necessary power at each reactor for various engine modes and allows calculation of how much power must be available to assure sufficient residual capacity at each reactor. Likewise, the model allows prediction of the necessary oxygen availability at each reactor so that the residual capacity is optimized by the availability of sufficient oxygen. In practice, the inventors have found that NTP 5 voltage should be maintained at approximately 25,000 Volts, while Oxygen levels should comprise approximately 18-25% of that gas stream by volume. (Cf., FIGS. 3A through 3C). Hence, these will generally be considered optimum levels to be maintained by the system of the invention.

PARTS LIST

1 diesel particulate filters ("DPFs")
1A diesel oxidation catalyst ("DOC")
2 exhaust gas recirculation ("EGR")
3 selective catalytic reduction ("SCR")
3A ammonia oxidation catalyst ("AOC")
4 diesel exhaust fluid ("DEF")
5 nonthermal plasma generator or reactor ("NTP")
6 electronic control module ("ECM")
7 air source or air compressor
8 temperature sensor
9 multiplexer
10 variable geometry turbocharger ("VGT")

In view of the foregoing, it should be clear that numerous changes and variations can be made without exceeding the scope of the inventive concept outlined. Accordingly, it is to be understood that the embodiment(s) of the invention herein described is/are merely illustrative of the application of the principles of the invention. Reference herein to details of the illustrated embodiment(s) is not intended to limit the scope of the claims, which recite those features regarded as essential to the invention.

The invention claimed is:

1. A calibrated non-thermal plasma system for control of internal combustion engine emissions, comprising:
    an internal combustion engine including an exhaust gas recirculation system receiving exhaust gas from an outlet for said engine and recirculating a portion of said exhaust gas to an engine intake for said engine while a remaining portion of said exhaust gas exits said recirculation system via a recirculation system outlet for processing in aftertreatment systems before exiting to the atmosphere;
    at least one non-thermal plasma reactor receiving and processing exhaust gas from said recirculation system intermediate said engine outlet and said recirculation system outlet;
    an air source providing air for injection into said exhaust stream intermediate said engine and said non-thermal plasma reactor via a control valve; and
    a control system to maximize removal of particulate matter from said exhaust gas stream comprising an electronic control module controlling at least one of power provided to said non-thermal plasma reactor, and said control valve providing air for injection into said exhaust stream;
    wherein said control system monitors oxygen levels intermediate said engine outlet and said at least one non-thermal plasma reactor, and actuates said control valve to maintain oxygen levels in said non-thermal plasma reactor at an optimum level to maximize elimination of particulate matter from said exhaust gas stream.

2. The system of claim 1, wherein at least one of:
    said at least one non-thermal reactor comprises at least one of: a plurality of non-thermal reactors arranged in parallel, and a plurality of non-thermal reactors arranged in series, and
    a multiplex voltage controller provides power to said at least one non-thermal reactor.

3. The system of claim 1, wherein at least one of: said at least one non-thermal reactor voltage is maintained at 25,000 Volts, and Oxygen maintained at 18-25% of the exhaust gas stream entering said at least one non-thermal reactor.

4. The system of claim 1, wherein said control system monitors oxygen levels intermediate said engine outlet and said at least one non-thermal plasma reactor, and actuates a power supply for said at least one non-thermal plasma reactor to maintain power levels in said at least one non-thermal plasma reactor at an optimum level to maximize elimination of particulate matter from said exhaust gas stream.

5. The system of claim 4, wherein at least one of:
    said at least one non-thermal reactor comprises at least one of: a plurality of non-thermal reactors arranged in parallel, and a plurality of non-thermal reactors arranged in series, and
    a multiplex voltage controller provides power to said at least one non-thermal reactor.

6. The system of claim 1, wherein said aftertreatment systems include at least one of:
    a diesel oxidation catalyst,
    a diesel particulate filter, and
    a selective catalytic reduction system.

7. The system of claim 6, wherein at least one of:
    said at least one non-thermal reactor comprises at least one of: a plurality of non-thermal reactors arranged in parallel, and a plurality of non-thermal reactors arranged in series, and
    a multiplex voltage controller provides power to said at least one non-thermal reactor.

8. The system of claim 6, wherein at least one of: said at least one non-thermal reactor voltage is maintained at 25,000 Volts, and Oxygen maintained at 18-25% of the exhaust gas stream entering said at least one non-thermal reactor.

9. The system of claim 6, wherein said control system monitors oxygen levels intermediate said engine outlet and said at least one non-thermal plasma reactor, and actuates a power supply for said at least one non-thermal plasma reactor to maintain power levels in said at least one non-thermal plasma reactor at an optimum level to maximize elimination of particulate matter from said exhaust gas stream.

10. The system of claim 9, wherein at least one of:
    said at least one non-thermal reactor comprises at least one of: a plurality of non-thermal reactors arranged in parallel, and a plurality of non-thermal reactors arranged in series, and
    a multiplex voltage controller provides power to said at least one non-thermal reactor.

11. A calibrated non-thermal plasma system for control of internal combustion engine emissions, comprising:
    an internal combustion engine including an exhaust gas recirculation system receiving exhaust gas from an outlet for said engine and recirculating a portion of said exhaust gas to an engine intake for said engine while a remaining portion of said exhaust gas exits said recirculation system via a recirculation system outlet for processing in aftertreatment systems before exiting to the atmosphere;

at least one non-thermal plasma reactor receiving and processing exhaust gas from said recirculation system intermediate said engine outlet and said recirculation system outlet;

an air source providing air for injection into said exhaust stream intermediate said engine and said non-thermal plasma reactor via a control valve; and a control system to maximize removal of particulate matter from said exhaust gas stream comprising an electronic control module controlling at least one of power provided to said non-thermal plasma reactor, and said control valve providing air for injection into said exhaust stream;

wherein said control system monitors oxygen levels intermediate said engine outlet and said at least one non-thermal plasma reactor, and actuates a power supply for said at least one non-thermal plasma reactor to maintain power levels in said at least one non-thermal plasma reactor at an optimum level to maximize elimination of particulate matter from said exhaust gas stream.

12. The system of claim 11, wherein at least one of:

said at least one non-thermal reactor comprises at least one of: a plurality of non-thermal reactors arranged in parallel, and a plurality of non-thermal reactors arranged in series, and a multiplex voltage controller provides power to said at least one non-thermal reactor.

13. The system of claim 11, wherein at least one of: said at least one non-thermal reactor voltage is maintained at 25,000 Volts, and Oxygen maintained at 18-25% of the exhaust gas stream entering said at least one non-thermal reactor.

14. The system of claim 11, wherein said aftertreatment systems include at least one of:

a diesel oxidation catalyst, a diesel particulate filter, and a selective catalytic reduction system.

15. The system of claim 14, wherein at least one of:

said at least one non-thermal reactor comprises at least one of: a plurality of non-thermal reactors arranged in parallel, and a plurality of non-thermal reactors arranged in series, and a multiplex voltage controller provides power to said at least one non-thermal reactor.

16. The system of claim 14, wherein at least one of: said at least one non-thermal reactor voltage is maintained at 25,000 Volts, and Oxygen maintained at 18-25% of the exhaust gas stream entering said at least one non-thermal reactor.

17. A calibrated non-thermal plasma system for control of internal combustion engine emissions, comprising:

an internal combustion engine including an exhaust gas recirculation system receiving exhaust gas from an outlet for said engine and recirculating a portion of said exhaust gas to an engine intake for said engine while a remaining portion of said exhaust gas exits said recirculation system via a recirculation system outlet for processing in aftertreatment systems before exiting to the atmosphere;

at least one non-thermal plasma reactor receiving and processing exhaust gas from said recirculation system intermediate said engine outlet and said recirculation system outlet;

an air source providing air for injection into said exhaust stream intermediate said engine and said non-thermal plasma reactor via a control valve; and a control system to maximize removal of particulate matter from said exhaust gas stream comprising an electronic control module controlling power provided to said non-thermal plasma reactor, and said control valve providing air for injection into said exhaust stream;

wherein at least one of: said at least one non-thermal reactor voltage is maintained at 25,000 Volts, and Oxygen maintained at 18-25% of the exhaust gas stream entering said at least one non-thermal reactor.

* * * * *